Aug. 19, 1952     A. C. REID     2,607,842
MARINE SEISMOMETER SPREAD
Filed March 2, 1949     2 SHEETS—SHEET 1
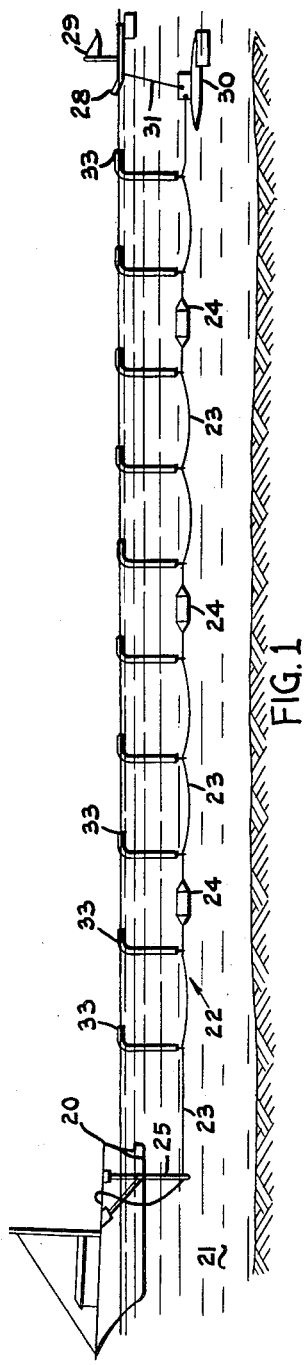
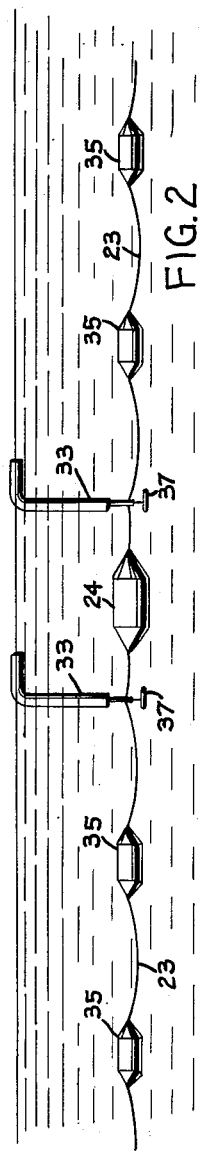
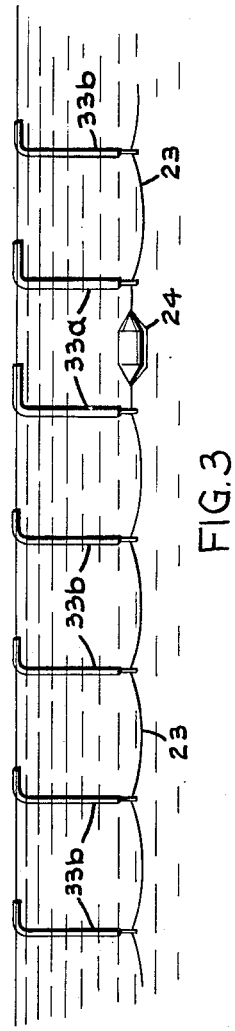
*INVENTOR:*
ALBERT C. REID
BY *Newell Pottorf*
ATTORNEY

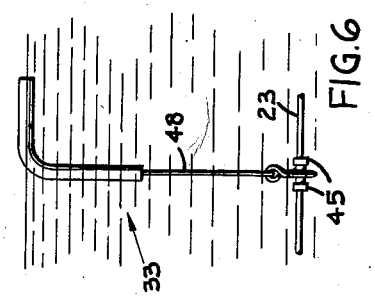
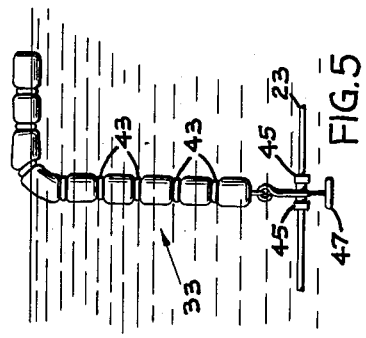
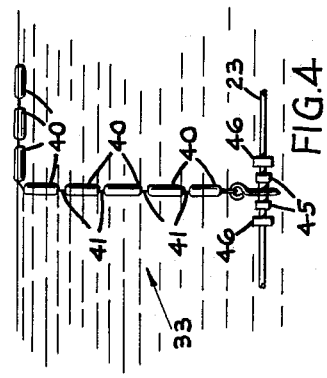
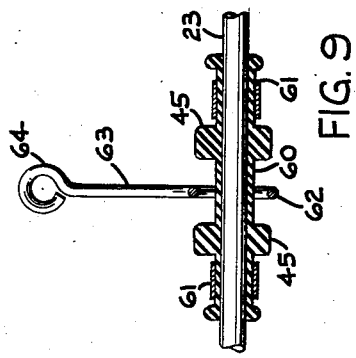
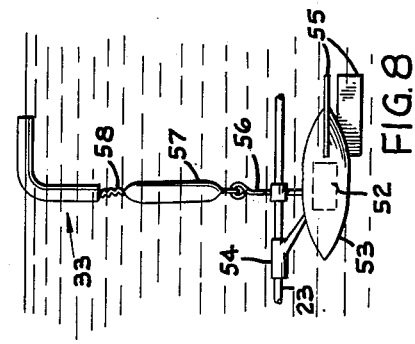
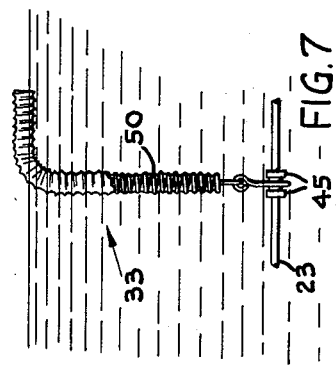

_Patented Aug. 19, 1952_

2,607,842

UNITED STATES PATENT OFFICE 2,607,842

MARINE SEISMOMETER SPREAD

Albert C. Reid, Tulsa, Okla., assignor to Stanolind Oil and Gas Company, Tulsa, Okla., a corporation of Delaware Application March 2, 1949, Serial No. 79,234

10 Claims. (Cl. 177—352)

This invention relates to geophysical surveying and is directed particularly to prospecting by the seismic method over water-covered areas such as in the Gulf of Mexico.

Geophysical surveying using artificially-created seismic waves has been extensively and successfully used on land for a number of years, but it is only comparatively recently that the method has been applied to off-shore explorations for oil and gas, particularly in the Gulf of Mexico. In the earliest applications of the seismic method to marine areas, the shots and detectors were individually placed on or under the marine floor in much the same manner as in prospecting on land. The results obtained were generally similar to those obtained on land prospects.

With the improvement and adaptation of specific techniques and instruments for this marine work, the speed of prospecting by this method has increased so markedly over what was previously possible either on land or water that, as a result, more than the normal ratio of geophysical effort in marine prospecting has been concentrated on the seismic method as compared with the magnetic and gravimetric methods, for example.

Both now and in the past one of the difficult problems connected with this method has been the proper handling of the seismometers used for detecting the seismic waves. Placing the seismometers at known locations in a spread on the marine floor as in land prospecting proved even more laborious and time-consuming than on land. Towing a spread of seismometers connected together by a conductor and tension cable along the marine floor or supported by floats behind the recording vessel from one location to another, and shooting either with the seismometers on the marine floor or supported from the floats have resulted in marked increases in the speed of carrying out the geophysical surveys. However, dragging of the seismometer spread along the sea bottom presents disadvantages in the obvious hazards both to the equipment and to the marine life and to installations located on the marine floor. Employing seismometers at or near the surface and supported by floats of conventional design results in the picking up of a great deal of noise, even under favorable conditions of low wind velocity and relatively smooth water surface. Even in calm seas, the noise picked up by near-surface seismometers is such as to mask most of the desired weak reflections, while on windy days and when the water surface is rough, the noise may be so strong as to override all reflections and make prospecting impossible. As a matter of fact, there are some seasons of the year in the Gulf of Mexico when the noise conditions from the water surface have been so troublesome that prospecting operations were possible only a small fraction of the time. The resultant delays while the crews and equipment are held in readiness for favorable working conditions add very greatly to the expense of the operation.

It is, accordingly, a primary object of my invention to provide a marine seismometer assembly which gives a greatly improved signal-to-noise ratio, permitting the detection of deeper and weaker desired seismic reflection signals. Another object is to provide a seismometer spread assembly for marine prospecting in which the depth of the seismometers is automatically controlled to bring them to the most effective depth for signal reception. A further object is to provide a marine seismometer spread capable of operation under adverse weather or water conditions to obtain good geophysical data which could not hitherto be obtained under such conditions. Still another object is to provide a towable marine seismometer spread in which the depth of submergence of the seismometers is automatically float-controlled from the water surface, but in a manner which minimizes the transmission of noise signals from the water surface to the seismometers. A still further object is to provide a towable marine seismometer spread which creates a relatively small drag on the towing vessel, thereby reducing the travel time between shot points and increasing the speed of the prospecting operation. Still another and further object is to provide for a marine seismometer spread, a type of depth-controlling float which automatically regulates the seismometer depth and compensates for changes in buoyancy while effectively filtering out water-surface noises. Another and still further object of my invention is to provide a marine seismometer spread suitable for use in areas where the depth of water is too great to permit prospecting by methods which require placing the seismometers on the marine floor. Other and further objects, uses, and advantages of the invention will become apparent as the description proceeds.

From observations made under a variety of conditions, it has now been found that the range of depths in water where seismometers may be placed for the most efficient operation is relatively narrow. Due to the greatly different seismic-wave transmission properties of air and water, seismic waves traveling upward from the earth below the water through the water to its surface are almost totally reflected there. As a result, there is a strong probability of interference between succeeding waves in a train of seismic waves at a depth in the water which is one-quarter of the seismic wave length in that medium. To avoid this possible interference, which changes the "character" or appearance of the detected waves, it is therefore desirable to locate the seismometers as close as possible to the water surface. It is at this surface that the displacements are a maximum and hence the possible interference is a minimum.

As was briefly indicated above, it has been found that the level of the noise within the seismic wave band is a maximum at the water surface, and further that this noise drops off very sharply with depth. There is accordingly a narrow range of depths for optimum seismometer operation. The upper limit of this range is immediately below the zone of surface water noise and is determined by the place where the noise level drops to a satisfactorily low value. The lower limit of the range is the depth at which interference effects become pronounced for waves of interest in the seismic band and is in practice somewhat less than the quarter-wave-length depth, which is where the interference becomes a maximum. Partial interference is noticeable at shallower depths. This range appears to be between 5 and 15 feet, with the preferred depth of operation being about 10 feet. Above this range the noise level is generally appreciable, while below it interference is observed for waves of interest in the seismic band. In areas where strong reflections are found and on days when the water surface is unusually calm, operations may be conducted above 5 feet but still below the water surface, and the resulting noise is not too great to be tolerated.

The foregoing enumerated and other objects of my invention are accomplished by a marine seismometer spread which is designed to be towed through the water at some distance below the water surface and to submerge automatically to the desired operating depth at a shooting location. This depth control is achieved by a particular design of float for suspending the negatively buoyant cable and seismometers. The preferred floats are flexible, elongated, tubular members of a considerable length, generally of the same order of magnitude as the desired depth of seismometer submergence, which members are attached by one end to the seismometer or the cable, and have the other end extending to the water surface. Being flexible, any excess length of the float beyond that required to support the attached portion of the spread does not project appreciably above the water surface, but lies along this surface parallel to it. The float being of small cross-sectional area, wave motions at the water surface have a minimum effect on varying the total buoyancy of the submerged portion of the float, and thus the depth of submergence of the seismometer or cable is not varied in any appreciable degree by surface waves. Variations in the buoyancy of the cable or seismometers themselves are compensated automatically by small changes in the length of the submerged portion of the float, which, in all cases, is arranged to be less than the total length of the float.

As the float is constructed of material which is highly flexible and compliant, noise which is generated by motions of the water relative to a rigid float is absent. Other water-surface noises are attenuated by the resilience of the float material which damps out, rather than transmits, vibrations impressed on it.

This will be better understood by reference to the accompanying drawings, forming a part of this application and illustrating typical embodiments of my invention, in which drawings like numerals are applied to the same or corresponding parts in the different figures. In these drawings, Figure 1 is a cross-section of a body of water through which a marine seismometer spread, constructed in accordance with the invention, is being towed by a vessel and is shown in a position suitable for making a record;

Figure 2 is a cross-section of water showing an embodiment of the invention used for depth control as distinguished from support for the spread;

Figure 3 is a similar cross-section showing a modification of the spread of Figure 1;

Figures 4, 5, 6, and 7 are cross-sections of water showing various advantageous embodiments of the float of my invention;

Figure 8 shows a modification of a seismometer assembly, consisting of a separate seismometer-supporting float and the depth-controlling float of the invention; and, Figure 9 is a cross-section showing a means of coupling the float of the invention to the spread cable.

Referring now to these drawings in detail and to Figure 1 in particular, a vessel 20 is shown proceeding through a body of water 21, towing a spread 22 constructed in accordance with my invention. Spread 22 is made up of a tension and conductor cable 23, attached to vessel 20 and having both a considerable tensile strength for connecting together and towing the various components, and a plurality of insulated electrical conductors for the seismometer signal leads. Spaced at any desired intervals along the length of cable 23 are a plurality of streamlined, detector-containing units 24, which may be more or less buoyant in the water 21. The detector housed within each unit 24 is appropriately connected by a waterproof splice and insulated lead to the conductors within the cable 23. Towing force is preferably applied from the vessel 20 to the spread 22 by connection to the vessel 20 at the desired operating depth for the detectors in units 24, such as by means of the spar 25 which projects down into water 21 to the desired depth, and to which the forward end of cable 23 is attached. While being towed, and during forward motion through the water, spread 22 is maintained in tension, and also to some extent when it is slowed down or stopped for recording, by an assembly connected to the trailing end at cable 23 consisting of a float 28, which may carry a flag 29, and a sinker 30 coupled to float 28 by a connecting lead 31. The length of lead 31 is adjusted so that this assembly maintains the trailing end of cable 23 at the desired operating depth in a manner similar to spar 25 on the forward end. Flag 29 which may be seen by an observer on the vessel 20 is useful for indicating the direction of the spread, particularly in the presence of cross-currents.

In accordance with my invention, spread 22 is supported at points intermediate the forward and trailing ends of cable 23 by a plurality of spaced buoyant, elongated tubular floats 33, attached by one end to the cable 23, and of a length sufficient to extend to the surface of water 21 and some distance beyond. These floats 33 are preferably quite flexible so that the top end of each float does not project appreciably above the surface of water 21, but bends over and lies along parallel to it, as shown in the drawings. The spacing of floats 33 along cable 23, and their relative buoyancies, are preferably so adjusted that a portion of each float 33 remains at the surface, and the cable 23 or the seismometer-containing unit 24 is then automatically balanced as to buoyancy by the submerged portion of each float 33, with the detector units 24 at the desired depth for operation. Stated otherwise, the negative buoyancy supported by each float is arranged to be less than its maximum positive buoyancy, so that there is always a portion of the float at the water surface to function as a reserve buoyancy. These floats 33 act as automatic depth controls in that changes in buoyancy of any portion of the spread are automatically compensated by changes in length of the submerged portion of the float. The intrduction of noise into the detector signals is prevented by at least three factors: (1) the top end of the float does not project appreciably above the water surface where it can be affected by winds; (2) the highly resilient material such as rubber or plastic film, of which the float is preferably constructed, is a poor conductor of such vibrations as may be impressed on the top end of the float; and (3) the slow change in buoyancy due to the small cross-sectional area of the tube as waves move past the surface end of the float, even if it is transmitted to the seismometer, is an impulse far below the frequency response of the recording equipment, as compared to the high-frequency jerks from a horizontal float concentrated at the surface. Furthermore, this comparatively small cross-sectional area of these floats renders the entire spread 22 more or less streamlined so that it is easily towed through the water by the vessel 20.

In Figure 1, the entire spread is supported by the floats 33 extending to the water surface. In Figure 2 is a modification of this invention in which the elongated, flexible, buoyant floats 33 are used not for the major support of the spread, but merely to control the depth of submergence of the seismometer-containing units 24. In this modification, the chief support of the negatively buoyant cable 23 and seismometers in units 24, is provided by attached buoyant cable floats 35, which are preferably streamlined and extend along the length of the cable itself, and by making the unit 24 itself buoyant in the water 21. The buoyancy of floats 35 and of the unit 24 is adjusted either by spacing or by the addition of small weights, to bring each portion of the whole spread consisting of the cable 23 and the seismometers of units 24 to an approximately neutral value of buoyancy in the water. Automatic and accurate control of the depth of the seismometer unit 24 is then provided by one or more of the buoyant floats 33 connected to spread 22, preferably at a short lateral distance from each seismometer unit 24, the excess buoyancy of the submerged portions of the floats 33 at the desired operating depth for the unit 24 being countered by attaching weights 37 at the lower ends of these floats. The tension in cable 23, maintained by the end assembly consisting of float 28 and sinker 30, or due to the forward motion of the spread through the water, with this assembly omitted if desired, is then effective in cooperation with the depth-control floats 33 operating at definite points of the cable 23 to maintain the seismometer units 24 at the optimum shooting depth.

In Figure 3 is shown a particularly advantageous embodiment of the spread of Figure 1 in which the cable 23 and seismometer units 24 are entirely supported by the elongated floats 33. In this figure, the particular floats 33a connected to the cable 23 and chiefly responsible for the depth control of the seismometer units 24 are of distinctly larger cross-sectional area than the floats 33b, spaced along the cable 23 itself, between the locations of seismometer units 24. By thus making the buoyancy per-unit-length of the floats 33 different depending on the amount of the support for the spread 22 required of them, the spacing of these floats along the cable may be maintained reasonably uniform. It is preferred that the floats 33b support cable 23 at points spaced from 15 to 50 feet apart—for example, about 25 feet. Unsupported sections of cable 23 longer than 50 feet or so are undesirable. The point of attachment of the floats 33a to the cable 23 on either side of the seismometer unit 24 is spaced from that unit by distances of from one to 10 feet—preferably about 3 feet. This provides a somewhat greater length of path for attenuating noise vibrations impressed on the top ends of the floats 33a. Although the seismometer unit 24 of Figure 3 may be completely non-buoyant, it is preferred, however, that it possess a substantial buoyancy in the water so that its entire support is not provided by the floats 33a. It is preferred also to adjust the buoyancy per unit length of the floats 33b and their spacing along the cable so that the desired spacing interval can be maintained reasonably uniform without the addition of many balancing weights 37.

It will be noted that when float 33 is in the form of a single elongated flexible tube, it will be collapsed by the water pressure at its lower end, if the inflation pressure is less than the hydrostatic pressure at that depth. As a matter of fact, by permitting more or less of the float 33 to collapse under the pressure of the water at its lower end, a convenient method of adjusting the buoyancy of these floats is provided, in that it is only necessary to vary the inflation pressure to change the buoyancy of the submerged portion of the float. In some cases, however, the required inflation pressure will render the upper portion of the float more rigid than is desirable, which may interfere with its tendency to lie flat along the water surface. One way of overcoming this is to fix a small weight to the top end of the float sufficient to make it bend over and lie flat along the water surface. Another way to achieve the same result is to construct float 33 of coupled, individually-inflated sections, at least two and preferably several in number, as shown in Figure 4. With such an arrangement it is impossible for the water pressure at the lower end of the float to cause complete collapse of any one of the individual sections 40, held together by the highly flexible cords 41. The individual sections 40 may be all inflated to the same pressure, or those submerged to greater depths in the water may be inflated to higher pressures than those at the surface, so that the latter are more flexible.

A similar arrangement is shown in Figure 5, in which the float 33 comprises a single elongated tube, which is effectively divided into at least two, and preferably several, individual sections by internal discs around which the outside tubular member of the float 33 is held by wrappings or clamps 43 thus forming a series of isolated pockets. In this case, also, it is possible to increase the flexibility of the upper portion of the float 33 by having lower inflation pressures for the tube. Any excess buoyancy of the submerged portion of the float 33 when the cable 23 is at the desired depth can be balanced out by small lead straps 46 wrapped around cable 23 close to the point of attachment of the float to the cable (Figure 4) or by a single weight 47 attached to the lower end of float 33 itself, as shown in Figure 5. The float 33 in these two figures is preferably loosely attached to the cable 23 to permit rotation or twisting of the cable without wrapping the float or its connecting lead around it. A pair of shoulders 45 fixed to the cable 23 prevent the point of attachment of the float 33 from shifting along the cable.

In Figure 6 is shown another way, besides spacing and variable inflation pressures, to have simultaneously the proper buoyancy for the float 33 and the proper depth of submergence of the cable 23. When the length of float 33 required to support the attached negatively buoyant portion of cable 23 is considerably less than the desired depth of submergence of the cable, it is only necessary to insert between the lower end of float 33 and the point of attachment to cable 23 a cord 48 of the proper length to let the cable 23 be at the desired depth. This cord can be either made of fibers and have a fixed length, or resilient and of a length varying with the applied tension to attenuate noise vibrations further.

In Figure 7 is another embodiment for the float 33 which has the advantage of high flexibility with low inflation pressure and at the same time avoids the collapsing of the lower end of the float by the pressure of the water. The float 33 in Figure 7, or at least the lower end of the submerged portion of it, is internally supported by a highly flexible helical wire spring 50 which is radially rigid but highly extensible lengthwise. It thus supports the lower end of the tubing of float 33 against collapse by external pressure without interfering with free flexing of the tube at the water surface.

In Figure 8 is shown an embodiment of a marine seismometer employing the depth-controlling float of the invention in a somewhat different manner from those in the preceding figures. The negatively buoyant seismometer 52 is surrounded by a small streamlining housing 53 and electrically connected to the conductors in cable 23 by the waterproof splice 54. Vanes 55 on housing 53 improve its towing qualities through the water, while a rigid rod 56 connects the housing 53 and the cable 23 to a main supporting float 57. This float 57 is preferably a resilient, inflatable unit of substantially fixed buoyancy designed to support the major portion of the negative buoyancy of the seismometer 52, the housing 53, and the cable 23. Rod 56 is of a length such that the supporting moment of float 57 holds the seismometer in an upright position and counteracts any tendency of the cable 23 to twist. The remainder of the required support is provided by the varying buoyancy of the elongated flexible tubular depth-controlling float 33 attached either to the seismometer itself or to the upper end of supporting float 57 by a resilient connection 58. This assembly is one having good towing properties in the water 21, and it simultaneously obviates the need for gimbal-suspension of the seismometer 52.

A simple and effective device for connecting the cable 23 and the float 33 while permitting free rotation of the cable is shown in Figure 9. A non-metallic, resilient cylindrical sleeve 60, carrying the two shoulders 45 and provided with extensions beyond these shoulders, surrounds the cable 23 and is held from slipping longitudinally along the cable by the clamps or wire wrappings 61. Surrounding the central portion of sleeve 60 between the shoulders 45 is a metallic ring 62 fixed to or part of a rod 63 extending radially from the cable and terminating in a ring 64 to which the end of the float 33 is attached. Ring 62 fits loosely around the sleeve 60, permitting free rotation of cable 23, and the rod 63 prevents any possibility of the connecting cord to the float 33 being wrapped around cable 23. By making sleeve 60 of rubber, its contact with metal ring 62 is effectively lubricated by the water, and relative rotations of the ring and sleeve do not generate noise in the seismic-wave band. Preferably rings 62 and 64 are formed on the ends of the rod 63 by bending it into the proper shapes.

While I have thus described my invention in terms of the foregoing specific embodiments, numerous useful modifications will occur to those skilled in the art. For example, when the expression "attached at one end" is employed herein with regard to the manner of attaching the elongated float to the spread, "substantially at one end" is meant. Thus an elongated tube could be attached by its center to the spread cable, and the result would in effect be two elongated floats in parallel, each attached by one end to the cable. Likewise, although tubular floats of substantially uniform diameter have been illustrated, a tube having a varying diameter along its length might prove equally useful in many instances. The scope of the invention therefore should not be considered as limited to the exact details set forth, but is to be ascertained from the scope of the appended claims.

I claim:

1. A marine seismometer assembly adapted for towing by a vessel through a body of water comprising a tension and conductor cable, a plurality of seismometers spaced along said cable and connected to conductors therein, a plurality of spaced elongated flexible tubular floats, and means for attaching each of said floats to said cable, including a resilient non-metallic sleeve surrounding said cable and having a pair of spaced annular shoulders, means for fastening said sleeve to said cable, and a rigid metal rod having one end formed into a ring loosely surrounding said sleeve between said shoulders and of smaller diameter than said shoulders, the other end of said rod being attached to said float.

2. A marine seismic-surveying assembly adapted for towing by a vessel through a body of water comprising a spread consisting of a tension and conductor cable and a plurality of seismic-wave detectors spaced along said cable and connected to conductors therein, and a plurality of spaced, buoyant floats attached to said spread and at least in part supporting it below the surface of the water, each of said floats comprising an elongated, flexible, buoyant member having, when in use, two portions, one portion extending generally vertically through the water below the surface and providing positive buoyancy, and the other portion extending generally horizontally along the water surface, the flexibility of said member being so great that the surface portion is not self-supporting vertically by the below-surface portion but collapses to a horizontal position along the water surface, and the positive buoyancy exerted by said float being normally equal to the negative buoyancy of the adjacent portion of said spread, but variably greater or less than normal as the relative amounts of said two portions are varied by wave motions.

3. A marine seismic-surveying assembly as in claim 2 in which said elongated, flexible, buoyant member is formed of a plurality of individual, buoyant sections connected together.

4. A marine seismic-surveying assembly according to claim 2 in which there is a connecting means between each of said floats and said spread comprising a connecting cord extending from the end of said member to said spread at a desired depth in the water, the length of said connecting cord being a substantial portion of the depth of submergence of said spread.

5. A marine seismic-surveying assembly according to claim 2 in which said elongated, flexible member is tubular in form, and including flexible, radially rigid means supporting the walls of said tubular member to prevent its being collapsed by water pressure.

6. A marine seismic-surveying assembly adapted for towing by a vessel through a body of water comprising a spread consisting of a tension and conductor cable and a plurality of seismic-wave detectors spaced along said cable and connected to conductors therein, a plurality of spaced floats supporting said cable and detectors, the buoyancy of said floats, detectors, and cable being adjusted to give said spread a substantially neutral density in the water except near each of said detectors where the buoyancy is negative, at least one depth-controlling float attached to said spread near each of said detectors, said depth-controlling float comprising an elongated, flexible, buoyant member having, when in use, two portions, one portion extending generally vertically through the water below the surface and providing positive buoyancy to balance said negative buoyancy, and the other portion extending generally horizontally along the water surface, the flexibility of said member being so great that the surface portion is not self-supporting vertically by the below-surface portion but collapses to a horizontal position along the water surface, and the positive buoyancy exerted by said float being normally equal to the negative buoyancy of the adjacent detector and cable, but variably greater or less than normal as the relative amounts of said two portions are varied by wave motions.

7. A marine seismic-surveying assembly as in claim 6 in which there are two of said depth-controlling floats for each of said detectors, one of said two floats being attached to said cable on each side of and a short lateral distance away from the detector.

8. A marine seismometer assembly adapted for towing by a vessel through a body of water comprising a spread consisting of a tension and conductor cable and a plurality of seismometers spaced along said cable and connected to conductors therein, and a plurality of spaced supporting floats attached to said spread, the spacing of said floats being such that the negative buoyancy of the portion of said spread supported by each float is less than the maximum positive buoyancy each float is capable of exerting, whereby at least a part of said float remains at the water surface, each of said floats comprising an elongated, flexible, tubular, buoyant member having, when in use, two portions, one portion extending generally vertically through the water at the surface and providing the positive buoyancy, and the other portion extending generally horizontally along the water surface, the flexibility of said member being so great that the surface portion is not self-supporting vertically by the below-surface portion but collapses to a horizontal position along the water surface, and the positive buoyancy exerted by said float being normally equal to the negative buoyancy of the adjacent portion of said spread, but variably greater or less than normal as the relative amounts of said two portions are varied by wave motions.

9. A marine seismometer assembly adapted for towing by a vessel through a body of water comprising a spread consisting of a tension and conductor cable and a plurality of seismometers spaced along and connected to conductors in said cable, a plurality of floats supporting said spread below the water surface, each of said floats comprising an elongated, flexible, buoyant member having, when in use, two portions and including means for attaching one end of said member to said spread, one portion of said member extending generally vertically through the water below the surface and providing positive buoyancy, and the other portion extending generally horizontally along the water surface, the flexibility of said member being so great that the surface portion is not self-supporting vertically by the below-surface portion but collapses to a horizontal position along the water surface, the positive buoyancy exerted by said float being normally equal to the negative buoyancy of the adjacent portion of said spread, but variably greater or less than normal as the relative amounts of said two portions are varied by wave motions, and the combined length of the submerged portion of said member and said attaching means being between 5 and 15 and preferably about 10 feet.

10. A marine seismometer assembly adapted for towing by a vessel through a body of water comprising a tension and conductor cable, a plurality of negatively buoyant seismometers spaced along said cable, buoyant means supporting said cable below the water surface, insulated electrical leads connecting each of said seismometers to conductors in said cable, a pair of floats attached to and supporting each of said seismometers at a desired operating depth in the water, one of said floats having a substantially fixed positive buoyancy and being completely submerged when said seismometer is at said desired depth, and the other of said floats being an elongated, flexible, tubular, buoyant member having, when in use, two portions, one portion extending generally vertically through the water below the surface and providing additional positive buoyancy, and the other portion extending generally horizontally along the water surface, the flexibility of said member being so great that the surface portion is not self-supporting vertically by the below-surface portion but collapses to a horizontal position along the water surface, and the positive buoyancy exerted by said float being normally equal to the residual negative buoyancy of the attached seismometer, but variably greater or less than normal as the relative amounts of said two portions of said member are varied by wave motions.

ALBERT C. REID.

(References on following page)

REFERENCES CITED

The following references are of record in the file of this patent:

UNITED STATES PATENTS

| Number | Name | Date |
|---|---|---|
| 1,470,733 | Hayes | Oct. 16, 1923 |
| 2,203,894 | Cooke | June 11, 1940 |
| 2,241,428 | Silverman | May 13, 1941 |
| 2,449,085 | Peterson | Sept. 14, 1948 |
| 2,465,696 | Paslay | Mar. 29, 1949 |
| 2,570,707 | Parr | Oct. 9, 1951 |

OTHER REFERENCES

Popular Mechanics, May 1941, pp. 728, 729 and 114A.